(12) United States Patent
Rabello et al.

(10) Patent No.: US 12,510,155 B2
(45) Date of Patent: Dec. 30, 2025

(54) PISTON RING AND INTERNAL COMBUSTION ENGINE

(71) Applicant: MAHLE International GmbH, Stuttgart (DE)

(72) Inventors: Rafael Rabello, Murtede (PT); Juliano Avelar Araújo, Coimbra (PT)

(73) Assignee: Mahle International GmbH (DE)

( * ) Notice: Subject to any disclaimer, the term of this patent is extended or adjusted under 35 U.S.C. 154(b) by 0 days.

(21) Appl. No.: 18/895,367

(22) Filed: Sep. 24, 2024

(65) Prior Publication Data

US 2025/0102062 A1    Mar. 27, 2025

(30) Foreign Application Priority Data

Sep. 25, 2023 (EP) ..................... 23199485

(51) Int. Cl.
*F16J 9/26* (2006.01)
*F16J 9/12* (2006.01)

(52) U.S. Cl.
CPC .. *F16J 9/26* (2013.01); *F16J 9/12* (2013.01)

(58) Field of Classification Search
CPC . F16J 9/12; F16J 9/14; F16J 9/20; F16J 9/22; F16J 9/26
USPC ................... 277/442, 443, 444, 499
See application file for complete search history.

(56) References Cited

U.S. PATENT DOCUMENTS

| | | | |
|---|---|---|---|
| 5,934,680 A * | 8/1999 | Kakehi | F16J 9/28 277/499 |
| 10,844,956 B2 | 11/2020 | Lee | |
| 11,162,586 B2 * | 11/2021 | Lima Sarabanda | C23C 14/024 |
| 11,933,407 B2 * | 3/2024 | Saito | F16J 9/12 |
| 12,123,500 B2 * | 10/2024 | Lima Sarabanda | C23C 14/024 |
| 2015/0354702 A1 | 12/2015 | Gray | |
| 2019/0093769 A1 * | 3/2019 | Lima Sarabanda | C23C 14/024 |
| 2022/0090680 A1 * | 3/2022 | Lima Sarabanda | C23C 14/0641 |
| 2023/0013831 A1 * | 1/2023 | Saito | F16J 9/12 |
| 2025/0012358 A1 * | 1/2025 | Lima Sarabanda | C23C 14/0641 |

FOREIGN PATENT DOCUMENTS

| | | |
|---|---|---|
| CN | 217501814 U | 9/2022 |
| EP | 3321543 A1 | 5/2018 |

OTHER PUBLICATIONS

English abstract for CN-217501814.
European Search Report for EP-23199485, dated Mar. 11, 2024.

* cited by examiner

*Primary Examiner* — Nicholas L Foster
(74) *Attorney, Agent, or Firm* — Fishman Stewart PLLC

(57) ABSTRACT

A piston ring for an internal combustion engine may include an annular base body and a protective coating arranged on an outer circumference of the base body. The base body may include a first joint flank, a second joint flank, an interruption along the circumferential direction, an axial end face, and an edge formed between the first joint flank and the end face. The interruption may form a joint bounded along a circumferential direction of the base body via the first joint flank and the second joint flank. The axial end face may include a radially outer surface section extending perpendicularly to a central longitudinal axis of the base body and merging radially inwards into a radially inner surface section extending at an obtuse angle to the central longitudinal axis. The edge may include a chamfer.

20 Claims, 2 Drawing Sheets

PISTON RING AND INTERNAL COMBUSTION ENGINE

CROSS-REFERENCE TO RELATED APPLICATION

This application claims priority to European Patent Application No. 23199485.6, filed on Sep. 25, 2023, the contents of which is hereby incorporated by reference in its entirety.

TECHNICAL FIELD

The invention relates to a piston ring for an internal combustion engine, and to an internal combustion engine with such a piston ring.

BACKGROUND

Different wear abrasive mechanisms are known caused in piston grooves by conventional piston rings for internal combustion engines: step wear, trumpet wear and flat wear.

A well-known solution to reduce these types of wear is to improve the strength of the piston groove material, e.g. by piston laser hardening. However, this proved to be a very expensive and process unfeasible solution.

SUMMARY

It is therefore an object of the present invention to provide an improved piston ring by means of which the occurrence of abrasion in the piston groove accommodating the piston ring can be reduced.

This object is achieved by the subject matter of the independent patent claim(s). Preferred embodiments are the subject matter of the dependent patent claim(s).

A piston ring according to the invention for an internal combustion engine comprises an annular base body, which has a central longitudinal axis extending along an axial direction and extends around the central longitudinal axis along a circumferential direction of the base body perpendicular to the axial direction. The base body has an interruption along the circumferential direction forming a joint. The interruption or the joint is bounded along the circumferential direction by a first and a second joint flank of the base body. An end face of the base body that is axial with respect to the axial direction encloses a radially outer surface section that extends perpendicular to the central longitudinal axis. The surface section merges radially inward along a radial direction of the base body into a radially inner surface section. This radially inner surface section is arranged at an obtuse angle to the central longitudinal axis. An extension of the radially outer surface section measured along the radial direction is at most 0.3 mm according to the invention. Such a maximum extension length leads to a significant reduction of the piston groove wear.

Furthermore, a (first) edge formed between the first joint flank and the end face has a (first) chamfer whose axial extent measured along the axial direction is at most 0.16 mm, preferably approximately 0.06. Furthermore, an extension of the (first) chamfer measured along the circumferential direction is at most 0.16 mm, preferably approximately 0.05 mm. By means of a such-designed edge, the occurrence of piston groove wear can be further reduced. Furthermore, a protective coating is arranged on an outer circumference of the annular base body.

Preferably, a base material of the base body can be stainless steel. The base material can comprise 10 to 17% of chromium.

In a preferred embodiment, a (second) edge formed between the second joint flank and the axial end face has a second chamfer having an axial extent measured along the axial direction of at most 0.16 mm, preferably of about 0.06 mm, and having an extent measured along the circumferential direction of at most 0.16 mm, preferably of about 0.05 mm.

According to another preferred embodiment, in order to reduce the occurrence of adhesive wear, which is the material transference from the piston groove material to the piston ring lower side face, an additional protective coating made of a polymer or Cr electroplating or DLC film is arranged on the axial end face of the piston's annular base body. The coating material can comprise a polymer or consists of such a polymer, or metallic chromium or carbon based films. The coating material based on polymeric structure can contain WC (tungsten carbide) particles.

Particularly expediently, the protective coating comprises or is a DLC coating. Such DLC coatings not only have a very high hardness, but also a particularly low coefficient of friction, which is particularly advantageous for driving the piston ring in an internal combustion engine, e.g. through increased seizure resistance. Particularly preferably, more than 50% of the bonds formed in the amorphous carbon of the DLC protective coating are formed by sp2 hybridized bonds. They provide advantageous sliding properties for the sliding element. Alternatively, or additionally, in this variant between 20% and 45% of the bonds formed in the amorphous carbon of the DLC protective coating are formed by sp3 bonds. Since the mechanical properties of the sp3 bonds are responsible for highest wear resistance for this DLC protective coating, the selected proportion of this bond form ensures a high hardness of the DLC protective coating and outstanding low friction behavior.

In a further preferred embodiment, a coating material of the protective coating may comprise or consist of a ceramic material, in particular a PVD ceramic coating based on nitrides. This coating material can be, for instance, a PVD Chromium Nitride (CrN), Chromium Aluminum Nitride (CrAlN), Chromium Aluminum Nitride multilayer (CrAlN/CrAlN), Chromium Nitride Niobium Nitride multilayer (NbN/CrN), Diamond Like Carbon films (DLC) and has the objective to improve the wear resistance and increase the piston rings life time.

According to an advantageous further development, an adhesion-promoting layer containing or consisting of chromium (Cr) can be sandwiched between the protective coating and the base body. In this way, the adhesion of the protective coating to the base material of the piston ring can be significantly improved.

Particularly expediently, a layer thickness of the additional protective coating can be between 5 μm and 40 μm, preferably between 15 μm and 30 μm.

According to a further advantageous further development, the axial end face has two texturing sections which, starting from a center position of the joint with respect to the circumferential direction, extend along the circumferential direction over a circumferential angle of at most 35°, preferably approximately 25°.

In this further development, the end face has one texturing in each of the two texturing sections. By means of said texturing, the area of the piston ring around the joint, which is subjected to particularly high mechanical loads when used in an internal combustion engine, can be additionally protected against abrasion.

Particularly preferably, the two textures can each be formed by a number of recesses, preferably arranged in a grid-like manner on the surface of the end face, preferably with a round, particularly preferably with a circular geometry. Texturing formed in this way can be produced in a particularly simple manner, in particular by irradiation with a laser beam.

In another preferred embodiment, at least one, preferably several, particularly preferably all, of the recesses has/have a depth measured perpendicular to the surface of between 5 µm and 20 µm, preferably between 8 µm and 12 µm, preferably of about 10 µm. In this embodiment, at least one, preferably several, particularly preferably all, of the recesses has/have a recess diameter between 30 µm and 90 µm, preferably between 50 µm and 70 µm, preferably of about 60 µm.

Particularly expediently, a surface proportion of the two texturing sections covered by the recesses may be between 15% and 35% in each case.

The invention further relates to an internal combustion engine for a motor vehicle, which has at least one cylinder which in turn surrounds a combustion chamber in which a piston is adjustably arranged. On an outer circumference of the piston at least one annular groove is formed, in which a piston ring according to the invention, explained above, is partially arranged or partially received, so that it is supported both on the cylinder and on the piston. The advantages of the piston ring according to the invention explained above therefore transfer to the internal combustion engine according to the invention. The axial end face of the piston ring is arranged axially away from the combustion chamber in the at least one annular groove.

In a preferred embodiment of the internal combustion engine according to the invention, a first, second and third annular groove are arranged axially spaced apart on the outer circumference of the piston. The first annular groove faces axially towards the combustion chamber, and the second annular groove is arranged axially between the first and third annular grooves. The piston ring according to the invention is arranged in the first annular groove.

Further important features and advantages of the invention will be apparent from the dependent claims, from the drawings and from the accompanying description of the figures with reference to the drawings.

It is understood that the above-mentioned features and those still to be explained below can be used not only in the combination indicated in each case, but also in other combinations or on their own, without leaving the scope of the present invention.

Preferred examples of embodiments of the invention are shown in the drawings and are explained in more detail in the following description, wherein the same reference signs refer to identical or similar or functionally identical components.

BRIEF DESCRIPTION OF THE DRAWINGS

They show, schematically in each case.

DETAILED DESCRIPTION

Figure 1:
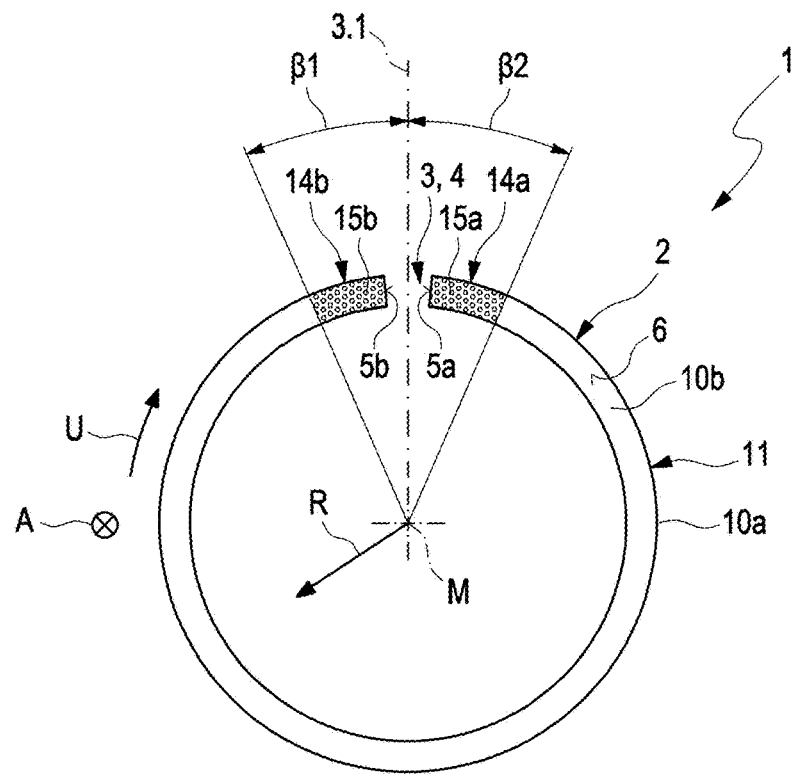
FIG. 1 shows an example of a piston ring according to the invention in an axial plan view.
Figure 2:
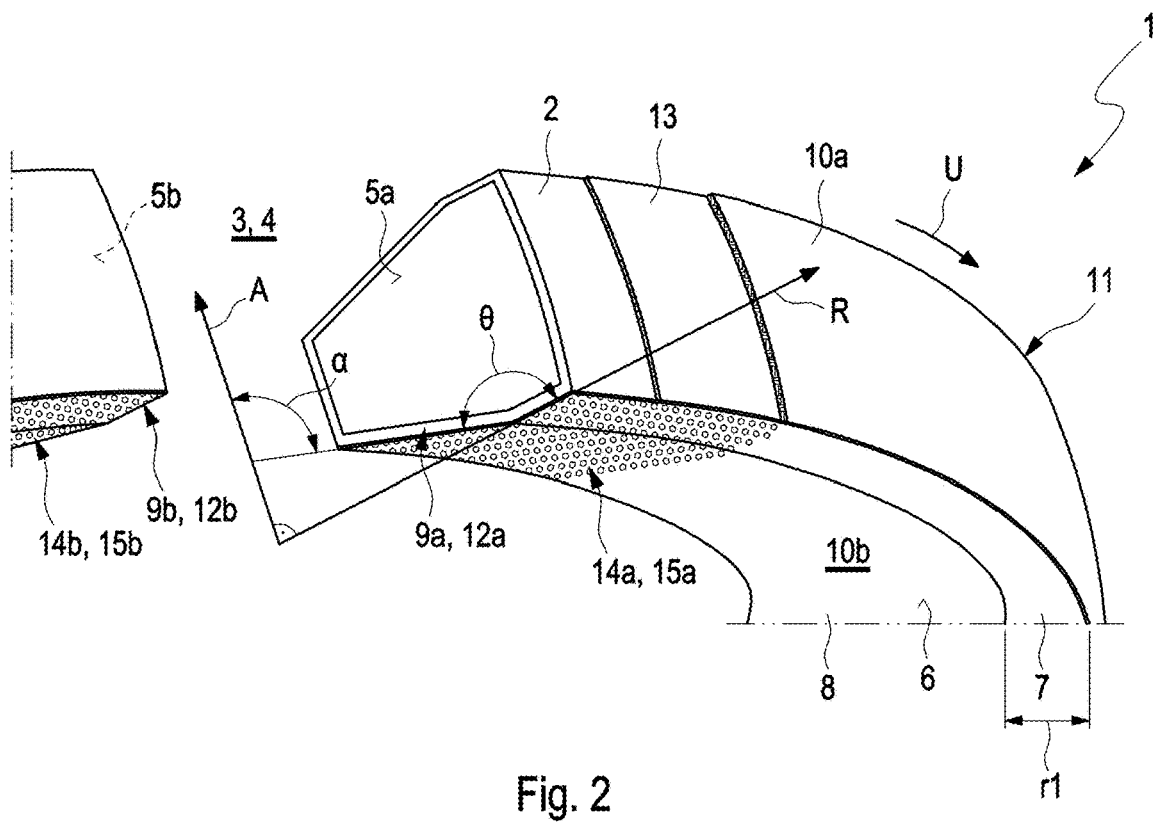
FIG. 2 shows the piston ring of FIG. 1 in a partial perspective view, FIGS. 3a and 3b each show a plan view of an outer circumference 11 of the piston ring along the radial direction R in the region of the first and second joint flank of the joint, respectively.

FIG. 1 shows an example of a piston ring 1 according to the invention for an internal combustion engine in a highly simplified plan view along an axial direction A, FIG. 2 is a partial perspective view of the piston ring of FIG. 1.

According to FIGS. 1 and 2, the piston ring 1 comprises an annular base body 2 which has a central longitudinal axis M extending along an axial direction A and which also extends circumferentially about the central longitudinal axis M along a circumferential direction U of the base body 2 perpendicular to the axial direction A. Further, a radial direction R extends perpendicular to the axial direction A and also perpendicular to the circumferential direction U orthogonally away from the central longitudinal axis M.

A base material of the base body 2 can be stainless steel. The base material can comprise be 10 to 17% of chromium.

According to FIG. 1, the base body 2 has an interruption 4 along the circumferential direction U forming a joint 3. The interruption 4 or the joint 3 is bounded along the circumferential direction U by a first and a second joint flank 5a, 5b of the basic body 2.

As can be seen from the perspective view of FIG. 2, an end face 6 of the basic body 2, which is axial with respect to the axial direction A, comprises a radially outer surface section 7, which extends perpendicular to the central longitudinal axis M. This radially outer surface section 7 merges radially inward along the radial direction R of the basic body 2 into a radially inner surface section 8. The radially inner surface section 8 is arranged at an obtuse angle α to the central longitudinal axis M. The radially outer surface section 7 and the radially inner surface section 8 are thus arranged at an obtuse angle θ to one another. An extension r1 of the radially outer surface section 7 measured along the radial direction R is at most 0.3 mm according to the invention.

Figure 3:
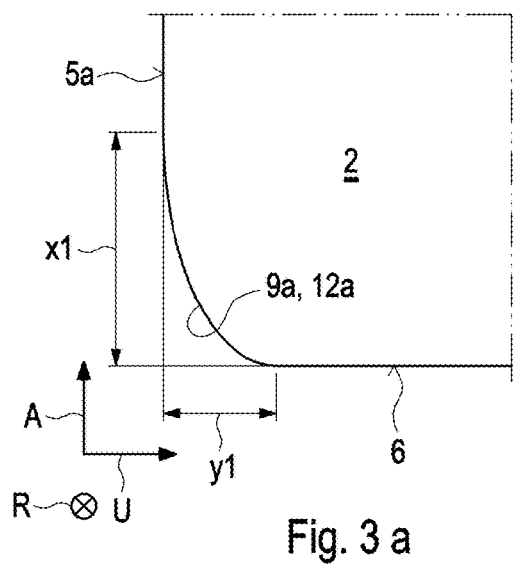
Figure 3:
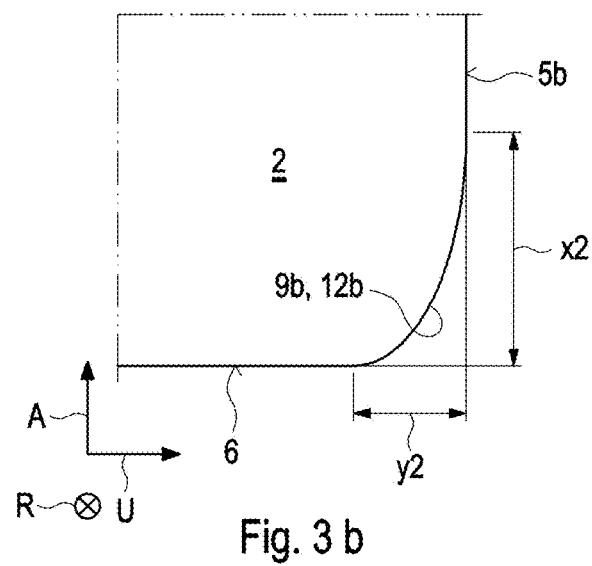

FIGS. 3a and 3b each show a plan view of an outer circumference 11 of the base body 2 along the radial direction R in the region of the first and second joint flanks 5a, 5b, respectively.

A first edge 12a formed between the first joint flank 5a, which can be seen in FIG. 3a, and the end face 6 thus has a first chamfer 9a, the axial extent x1 of which, measured along the axial direction, is at most 0.16 mm, preferably approximately 0.06 mm. Furthermore, an extension y1 of the first chamfer 9a measured along the circumferential direction U is at most 0.16 mm, preferably approximately 0.05 mm. Correspondingly, a second edge 12b formed between the second joint flank 5b (cf. FIG. 3b) and the axial end face has a second chamfer 9b whose axial extension x2 measured along the axial direction is at most 0.16 mm, preferably approximately 0.06 mm, and whose radial extension y2 measured along the circumferential direction U is at most 0.16 mm, preferably approximately 0.05 mm. Preferably, the first chamfer 9a and the second chamfer 9b can be identically formed as indicated in FIGS. 3a and 3b.

According to FIGS. 1 and 2, a protective coating 10a is arranged on the outer circumference 11 of the ring-shaped base body 2. A coating material of the protective coating 10a may be a ceramic material. In the example, protective coating 10a is formed by a DLC layer. An adhesion promoting layer 13 containing chromium (Cr) can be sandwiched between the protective coating 10a and the base body 2.

An additional protective coating 10b is arranged on the axial end face 6 of the annular base body 2, the coating material of which comprises a polymer or Chromium (Cr) electroplating or DLC films. A layer thickness of the additional protective coating 10b can be between 5 μm and 40 μm, preferably between 15 μm and 25 μm. The axial end face 6 may be a lower face facing away from the combustion chamber when the piston 1 is in operation in the internal combustion engine.

Furthermore, as indicated in FIG. 1, the axial end face 6 can have two texturing sections 14a, 14b which, starting from the first and second joint flanks 5a, 5b, respectively, extend along the circumferential direction U over a circumferential angle β1, β2, respectively, of at most 35°, preferably approximately 25, starting from a center position 3.1 of the joint 3 with respect to the circumferential direction U (cf. FIG. 1).

Figure 4:
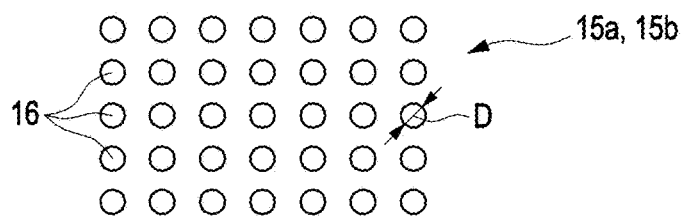
FIG. 4 shows a roughly schematic representation of surface texturing in the region of the two joint flanks of the joint.

The two texturing sections 14a, 14b have a texturing 15a, 15b roughly reproduced in FIG. 4. According to FIG. 4, the two textures 15a, 15b are each formed by a plurality of recesses 16 arranged in a grid-like manner on the surface of the end face 6 and having a round or circular geometry, as indicated in FIG. 4. A surface proportion of the two texturing sections 14a, 14b covered by the recesses 16 can be between 15% and 30% in each case (not shown in FIG. 4). The individual recesses can each have a recess diameter D of between 30 μm and 90 μm, preferably between 50 μm and 70 μm, particularly preferably of about 60 μm. Independently of this, the recesses 16 can each have a depth measured perpendicular to the surface of between 5 μm and 20 μm, preferably between 8 μm and 12 μm, preferably of about 10 μm.

Figure 5:
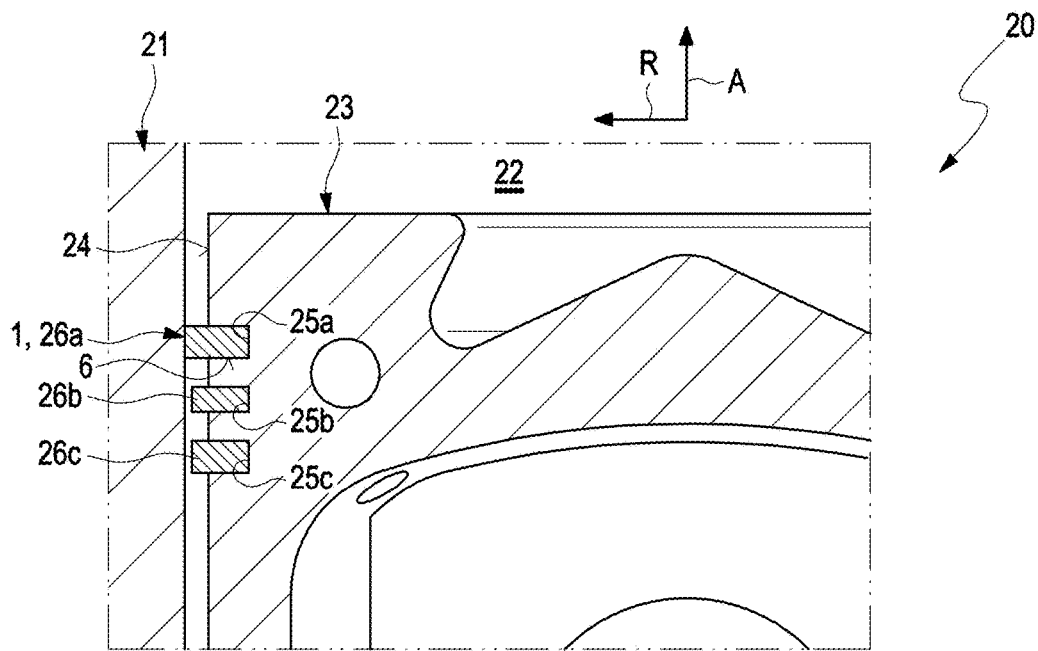
FIG. 5 shows an example of an internal combustion engine according to the invention with piston ring according to the invention in an axial longitudinal section.

FIG. 5 illustrates the use of the piston ring 1 explained above in an internal combustion engine 20. The internal combustion engine 20 comprises a cylinder 21 which surrounds a combustion chamber 22 and is partially shown in FIG. 5 in a longitudinal section along an axial direction A. The combustion chamber 22 comprises a cylindrical piston ring 1. A cylindrical piston 23 is arranged in the combustion chamber 22 so as to be adjustable along the axial direction A. On an outer circumference 24 of the piston 23, three annular grooves 25a, 25b, 25c are arranged axially spaced apart. A first 25a of the three annular grooves 25a-25c faces axially toward the combustion chamber 22. A third 25c of the three annular grooves 25a-25c faces axially away from the combustion chamber 22. Consequently, a second 25b of the three annular grooves 25a-25c is axially disposed between that of the first and third annular grooves 25a, 25c.

As FIG. 5 also shows, a piston ring 26a, 26b, 26c can be arranged in each of the three annular grooves 25a, 25b, 25c, which is supported radially inwardly on the piston 22 and radially outwardly on the cylinder 21 of the internal combustion engine, respectively.

The piston ring 26a arranged in the first annular groove 25a is a piston ring 1 according to the invention, as explained above, which functions as a compression ring. The axial end face 6 of the piston ring 1 is arranged axially facing away from the combustion chamber 2 in the first annular groove 25a.

The invention claimed is:

1. A piston ring for an internal combustion engine, comprising:
   an annular base body having a central longitudinal axis extending along an axial direction, the base body extending circumferentially about the central longitudinal axis along a circumferential direction of the base body perpendicular to the axial direction; and
   a protective coating arranged on an outer circumference of the base body;
   wherein the base body includes:
      a first joint flank;
      a second joint flank;
      an interruption along the circumferential direction forming a joint bounded along the circumferential direction via the first joint flank and the second joint flank;
      an axial end face including a radially outer surface section extending perpendicularly to the central longitudinal axis and merging radially inwards along a radial direction of the base body into a radially inner surface section extending at an obtuse angle to the central longitudinal axis, an extension of the radially outer surface section measured along the radial direction being 0.3 mm or less; and
      an edge formed between the first joint flank and the axial end face, the edge including a chamfer having: i) an axial extent measured along the axial direction of 0.16mm or less and ii) an extent measured along the circumferential direction of 0.16 mm.

2. The piston ring according to claim 1, wherein:
   the base body further includes an additional edge formed between the second joint flank and the axial end face; and
   the additional edge includes a second chamfer having: i) an axial extent measured along the axial direction of 0.16 mm or less and ii) an extent measured along the circumferential direction of 0.16 mm or less.

3. The piston ring according to claim 1, wherein a coating material of the protective coating includes a ceramic material.

4. The piston ring according to claim 1, wherein the protective coating is:
   a PVD ceramic coating based on nitriding; and/or
   a DLC layer.

5. The piston ring according to claim 1, further comprising an additional protective coating arranged on the axial end face of the base body, wherein a coating material of the additional protective coating includes a polymer, a Cr electroplating, and/or a DLC film.

6. The piston ring according to claim 1, further comprising an adhesion promoting layer arranged sandwiched between the protective coating and the base body, wherein the adhesion promoting layer includes chromium.

7. The piston ring according to claim 5, wherein a layer thickness of the additional protective coating is 5 μm to 40 μm.

8. The piston ring according to claim 1, wherein:
   the axial end face includes two texturing sections which, starting from a center position of the joint with respect to the circumferential direction each extend along the circumferential direction over a circumferential angle of 35° or less; and
   the axial end face has texturing arranged in each of the two texturing sections.

9. The piston ring according to claim 8, wherein the two texturing sections are each formed by a plurality of recesses arranged in a grid-like manner on a surface of the axial end face.

10. The piston ring according to claim 9, wherein at least one of the plurality of recesses has:
a depth measured perpendicular to the surface of the axial end face of 5 μm to 20 μm; and/or
a recess diameter of 30 μm to 90 μm.

11. The piston ring according to claim 9, wherein a surface proportion of each of the two texturing sections covered by the plurality of recesses is 15% to 35%.

12. The piston ring according to claim 1, wherein:
the axial extent of the chamfer measured along the axial direction is approximately 0.06 mm; and
the extent of the chamfer measured along the circumferential direction is approximately 0.05 mm.

13. The piston ring according to claim 2, wherein:
the axial extent of the second chamfer measured along the axial direction is approximately 0.06 mm; and
the extent of the second chamfer measured along the circumferential direction is approximately 0.05 mm.

14. The piston ring according to claim 7, wherein the layer thickness of the additional protective coating is 15 μm to 30 μm.

15. The piston ring according to claim 8, wherein the circumferential angle of at least one of the two texturing sections is approximately 25°.

16. The piston ring according to claim 9, wherein at least some of the plurality of recesses have a circular geometry.

17. The piston ring according to claim 9, wherein each of the plurality of recesses has:
a depth measured perpendicular to the surface of the axial end face of approximately 10 μm; and
a recess diameter of approximately 60 μm.

18. An internal combustion engine for a motor vehicle, comprising:
a piston including at least one annular groove disposed in an outer circumference of the piston;
at least one cylinder surrounding a combustion chamber in which the piston is displaceable arranged; and
a piston ring according to claim 1 partially arranged in the annular groove such that the piston ring is supported both on the cylinder and on the piston;
wherein the axial end face of the piston ring is arranged in the at least one annular groove facing away axially from the combustion chamber.

19. The internal combustion engine according to claim 18, wherein:
the at least one annular groove includes a first annular groove, a second annular groove, and a third annular groove arranged axially spaced apart from one another, the first annular groove facing axially towards the combustion chamber, the second annular groove arranged axially between the first annular groove and the third annular groove; and
the piston ring is arranged in the first annular groove.

20. The internal combustion engine according to claim 19, further comprising a second piston ring arranged in the second annular groove, wherein:
the second piston ring includes a second annular base body having a second central longitudinal axis extending along the axial direction, the second base body extending circumferentially about the second central longitudinal axis along the circumferential direction;
the second piston ring further includes a second protective coating arranged on an outer circumference of the second base body;
the second base body includes:
a first joint flank;
a second joint flank;
an interruption along the circumferential direction forming a joint bounded along the circumferential direction via the first joint flank and the second joint flank;
an axial end face including a radially outer surface section extending perpendicularly to the second central longitudinal axis and merging radially inwards along a radial direction of the second base body into a radially inner surface section extending at an obtuse angle to the second central longitudinal axis, an extension of the radially outer surface section measured along the radial direction being 0.3 mm or less; and
an edge formed between the first joint flank and the axial end face, the edge including a chamfer having: i) an axial extent measured along the axial direction of 0.16mm or less and ii) an extent measured along the circumferential direction of 0.16 mm; and
the axial end face of the second piston ring is arranged in the second annular groove facing axially away from the combustion chamber.

* * * * *